United States Patent
Irving et al.

(10) Patent No.: US 7,275,722 B2
(45) Date of Patent: Oct. 2, 2007

(54) WING TIP DEVICE

(75) Inventors: Jan Irving, Bristol (GB); Robert Davies, Bristol (GB)

(73) Assignee: Airbus UK Limited, Bristol (GB)

( * ) Notice: Subject to any disclaimer, the term of this patent is extended or adjusted under 35 U.S.C. 154(b) by 33 days.

(21) Appl. No.: 10/986,451

(22) Filed: Nov. 10, 2004

(65) Prior Publication Data
US 2005/0133672 A1   Jun. 23, 2005

(30) Foreign Application Priority Data
Nov. 10, 2003   (GB) ............................... 0326228.4

(51) Int. Cl.
*B64C 9/00* (2006.01)
(52) U.S. Cl. .................................................. 244/201
(58) Field of Classification Search ............. 244/199.2, 244/199.3, 199.4, 198, 199.1, 99.11
See application file for complete search history.

(56) References Cited

U.S. PATENT DOCUMENTS

| | | | | |
|---|---|---|---|---|
| 1,890,012 A | * | 12/1932 | Heraclio | 244/215 |
| 2,210,642 A | * | 8/1940 | Thompson | 244/35 R |
| 2,390,939 A | * | 12/1945 | Huff | 244/13 |
| 2,397,526 A | * | 4/1946 | Bonbright | 244/12.1 |
| 2,418,301 A | * | 4/1947 | Heal | 244/91 |
| 2,743,888 A | * | 5/1956 | Lippisch | 244/199.4 |
| 2,846,165 A | * | 8/1958 | Axelson | 244/90 R |
| 2,972,898 A | * | 2/1961 | Hartel | 74/105 |
| 3,025,022 A | * | 3/1962 | Girard | 244/7 A |
| 3,974,986 A | * | 8/1976 | Johnstone | 244/199.3 |
| 4,190,219 A | * | 2/1980 | Hackett | 244/199.4 |
| 4,247,062 A | * | 1/1981 | Brueckner | 244/91 |
| 4,247,063 A | * | 1/1981 | Jenkins | 244/91 |
| 4,429,844 A | * | 2/1984 | Brown et al. | 244/219 |
| 4,455,004 A | | 6/1984 | Whitaker, Sr. | |
| 4,457,479 A | * | 7/1984 | Daude | 244/203 |
| 4,477,042 A | * | 10/1984 | Griswold, II | 244/199.2 |

(Continued)

FOREIGN PATENT DOCUMENTS

DE    102 02 021 C1    6/2003

(Continued)

OTHER PUBLICATIONS

"Hydraulic machinery." Wikipedia, The Free Encyclopedia. Jun. 12, 2006, 10:43 UTC. Wikimedia Foundation, Inc. Jun. 14, 2006 <http://en.wikipedia.org/w/index.php?title=Hydraulic_machinery&oldid=58187318>.*

*Primary Examiner*—Teri Pham Luu
*Assistant Examiner*—Stephen A Holzen
(74) *Attorney, Agent, or Firm*—Patterson, Thuente, Skaar & Christensen, P.A.

(57) ABSTRACT

An aircraft comprises a wing tip device, for example a winglet, a raked-tip device, a wing tip fence or a planar wing extension, mounted in the region of the tip of a wing on the aircraft. The wing tip device is rotatably moveable between a first position and a second position, in which the upward lift produced by the wing or the wing tip device is reduced. During flight, the bending moment at the root of the aircraft wing therefore changes in dependence on the position of the wing tip device. The maximum bending moment in the aircraft wing sustained during high-load conditions is thereby reduced, allowing the structural mass of the aircraft to be reduced.

10 Claims, 4 Drawing Sheets

U.S. PATENT DOCUMENTS

| | | | | |
|---|---|---|---|---|
| 4,671,473 A * | 6/1987 | Goodson | | 244/199.4 |
| 4,698,041 A * | 10/1987 | Dasa | | 446/61 |
| 4,714,215 A * | 12/1987 | Jupp et al. | | 244/199.4 |
| 4,722,499 A * | 2/1988 | Klug | | 244/199.4 |
| 4,776,542 A * | 10/1988 | Van Dam | | 244/198 |
| 4,796,192 A | 1/1989 | Lewis | | |
| 4,867,396 A * | 9/1989 | Wainfan | | 244/215 |
| D304,821 S * | 11/1989 | Ratony | | D12/331 |
| 4,917,333 A * | 4/1990 | Murri | | 244/99.1 |
| 4,998,689 A * | 3/1991 | Woodcock | | 244/46 |
| 5,039,032 A * | 8/1991 | Rudolph | | 244/35 R |
| 5,078,338 A | 1/1992 | O'Neill et al. | | |
| 5,201,479 A * | 4/1993 | Renzelmann | | 244/49 |
| 5,310,138 A * | 5/1994 | Fitzgibbon | | 244/49 |
| 5,348,253 A * | 9/1994 | Gratzer | | 244/91 |
| 5,350,135 A * | 9/1994 | Renzelmann et al. | | 244/49 |
| 5,381,986 A * | 1/1995 | Smith et al. | | 244/49 |
| 5,407,153 A * | 4/1995 | Kirk et al. | | 244/199.4 |
| 5,427,329 A * | 6/1995 | Renzelmann et al. | | 244/49 |
| 5,538,202 A * | 7/1996 | Thornburg | | 244/215 |
| 5,634,613 A * | 6/1997 | McCarthy | | 244/199.1 |
| 5,785,282 A * | 7/1998 | Wake et al. | | 244/199.2 |
| 5,788,191 A * | 8/1998 | Wake et al. | | 244/199.2 |
| 5,988,563 A * | 11/1999 | Allen | | 244/49 |
| 6,076,766 A * | 6/2000 | Gruensfelder | | 244/49 |
| 6,089,502 A * | 7/2000 | Herrick et al. | | 244/35 R |
| 6,173,924 B1 * | 1/2001 | Young et al. | | 244/215 |
| 6,213,433 B1 * | 4/2001 | Gruensfelder et al. | | 244/219 |
| 6,227,487 B1 * | 5/2001 | Clark | | 244/99.12 |
| 6,345,790 B1 * | 2/2002 | Brix | | 244/199.4 |
| 6,394,397 B1 * | 5/2002 | Ngo et al. | | 244/199.3 |
| 6,422,518 B1 * | 7/2002 | Stuff et al. | | 244/199.2 |
| 6,484,968 B2 * | 11/2002 | Felker | | 244/91 |
| 6,497,600 B1 * | 12/2002 | Levy et al. | | 446/34 |
| 6,565,045 B1 * | 5/2003 | Correge et al. | | 244/215 |
| 6,607,161 B1 * | 8/2003 | Krysinski et al. | | 244/7 A |
| 6,722,615 B2 * | 4/2004 | Heller et al. | | 244/199.4 |
| 6,827,314 B2 * | 12/2004 | Barriety | | 244/201 |
| 6,886,778 B2 * | 5/2005 | McLean | | 244/45 R |
| 6,929,219 B2 * | 8/2005 | Wojciechowski | | 244/119 |
| 2002/0066831 A1 * | 6/2002 | Ngo et al. | | 244/199 |
| 2002/0162917 A1 * | 11/2002 | Heller et al. | | 244/199 |
| 2004/0000619 A1 * | 1/2004 | Barriety | | 244/219 |
| 2004/0155157 A1 * | 8/2004 | Bray | | 244/198 |
| 2005/0116116 A1 * | 6/2005 | Morgenstern | | 244/214 |

FOREIGN PATENT DOCUMENTS

| | | |
|---|---|---|
| EP | 1 375 342 | 1/2004 |
| GB | 355941 | 9/1931 |
| GB | 2 130 159 A | 5/1984 |
| GB | 2 282 996 | 4/1995 |

* cited by examiner

WING TIP DEVICE

The present invention relates to aircraft and, in particular but not exclusively, to wing tip devices for aircraft and the use thereof.

BACKGROUND OF THE INVENTION

Increasing aerodynamic efficiency is an important factor to be considered in commercial aircraft design. To this end a number of devices may be incorporated at the tip of wings, such as winglets, raked-tip devices, wing tip fences and planar wing extensions. Such wing tip devices are provided for purposes such as reducing the strength of the wing tip vortex, moving the wing tip vortex away from the fuselage, and/or increasing the upward lift over the tip portion of the wing.

Whilst improving aerodynamic efficiency, wing tip devices may lead, particularly during high-load conditions, to greater aerodynamic loads on the wing and therefore greater bending moments in the wing. (High-load conditions may occur during, for example, turbulence or a sharp turn.) The maximum bending moment to which a wing is expected to be subjected during its lifetime is likely to dictate the required strength of the wing. This in turn may dictate the weight of the wing. Thus, the gains in aerodynamic efficiency attained by adding a wing tip device have, in aircraft designs of the prior art, been offset by an increase in the structural mass of the aircraft required to cope with the increased wing loading.

It is an object of the present invention to provide an aircraft that is able to benefit from the improved aerodynamic efficiency that can be achieved through the provision of a wing tip device, whilst mitigating the problems associated with the increase in structural mass suffered by the above-mentioned prior art.

SUMMARY OF THE INVENTION

The present invention provides an aircraft comprising a wing, the wing comprising a root, a tip, and a wing tip device mounted in the region of the tip, wherein the wing tip device is rotatably moveable between a first position and a second position, the axis of rotation of the wing tip device being so positioned that the angle between the axis and the plane with which the wing is generally aligned is less than 45 degrees, and the wing tip device is so arranged that, during flight of the aircraft, the bending moment at the root changes in dependence on the position of the wing tip device.

The bending moment, for example the maximum bending moment likely to be sustained, at the root of the wing sustained during high-load flight conditions may thereby be reduced. Also, the mass of the aircraft may as a result be reduced.

The root is located at the proximal end of the wing. The tip is located at the distal end of the wing. It will be understood that the wing tip device need not be mounted at the farthest point of the wing from the root, but may for example be mounted at a position in the region of, but spaced apart from, the tip of the wing. The region of the wing in which the tip device may be located may be the end 10%, by area, of the wing.

The term 'wing tip device' is used herein to describe a device that defines a surface that improves the aerodynamic efficiency of the aircraft. Thus, the wing tip device may comprise a winglet. The wing tip device may comprise a raked tip device. The wing tip device may comprise a planar wing extension. Of course, the wing tip device may comprise any other device similar to the foregoing.

U.S. Pat. No. 4,457,479 (Daude) discloses an aircraft having a pair of wings, each wing being provided with a vertically projecting winglet at the end of each wing. Each winglet therefore has no significant cant (the cant being the angle of the winglet from the vertical) and also does not in use directly provide any upward lift during straight and level flight. The two winglets are mounted for rotation about a fixed vertical axis in such a way that the movement and orientation of one winglet are symmetrical with the other winglet about the vertical plane that includes the centre-line of the fuselage. In a certain position each winglet modifies the air-flow over the wing to improve aerodynamic efficiency. According to U.S. Pat. No. 4,457,479, rotation of a winglet alters the winglet toe (the toe being the angle, when viewed from above, between the winglet chord and the vertical plane including the longitudinal axis of the aircraft) thereby altering the angle of incidence of the winglet. By altering the toe of the winglet, the airflow over the wing is altered and the load on the wing may thereby be reduced, hence reducing the bending moment in the wing. In contrast to this prior art proposal, the present invention concerns a wing tip device that is movable about an axis of rotation that is not necessarily fixed and which is more horizontal than vertical. The present invention thus facilitates an arrangement in which (a) in one position a wing tip device improves the overall aerodynamics of the wing, thereby improving the aerodynamic efficiency, improving the upward lift provided by the wing and/or reducing drag (for example by the wing tip device generating thrust from the cross-flow of air generated in the region of the tip and/or by reducing the energy lost in the wing tip vortex, thereby reducing the effects of drag, and also, by straightening the airflow over the wing in the region of the tip thereby increasing lift generated by the wing in the region of the tip) and (b) in another position, the airflow over the wing is altered (for example by altering the cross-flow of air over the wing) in such a way as to reduce the upward lift generated by the wing and also the incidence of the wing tip device is altered in such a way as to cause the wing tip device to generate less upward lift itself, thereby further reducing the bending moment. Such a dual reduction in the bending moment of the wing is not provided, or envisaged, by the Daude patent, which does not envisage the winglet directly generating any vertical lift, let alone changing the vertical lift directly provided by the winglet to reduce the bending moment on the wing. The subject matter of the present invention also enables the provision of several further advantageous features, some of which are described below.

The aircraft and wing tip device of the present invention may be so configured and arranged that the first position is that position held by the wing tip device during standard flight conditions, such as take-off, climb and cruise. This position may, for example, be the position for optimum aircraft lift to drag ratio. Such a position may be ascertained by means of techniques that are well known to a person skilled in the art.

It will be understood that the wing tip device may be movable to one or more other positions other than the first and second positions. For example, the wing tip device may be movable from the first position to any position in the range of ±90 degrees about the axis of rotation of the wing tip device. The wing tip device may be movable from the first position to any of an infinite number of positions between the first and second positions. The wing tip device may of course be movable to a position outside of the range of movement between the first and second positions. For example, the wing tip device may be movable from the first position to a position beyond the second position.

During use in high-load conditions, the wing tip device may be moved from the first position to the second position in which the airflow over the region of the tip of the aircraft wing to which the device is connected is altered. Preferably the wing tip device is so arranged that, during flight of the aircraft, the upward lift generated by the wing in the region of the tip, when the wing tip device is in the second position, is less than the upward lift that would be generated by the wing in the region of the tip were the wing tip device in the first position.

Alternatively, or additionally, the upward lift generated by the wing tip device itself, when the wing tip device is in the second position, may be less than the upward lift that would be generated by the wing tip device were the wing tip device in the first position. This may be achieved, for example, by stalling the device or reducing its incidence. Preferably, the mean incidence of the wing tip device, when the wing tip device is in the second position, is less than the mean incidence of the wing tip device were the wing tip device in the first position.

Alternatively, or additionally, the load generated on the wing tip device itself, when the wing tip device is in the second position, may be less than the load that would be generated on the wing tip device were the wing tip device in the first position. This may be achieved, for example, by careful design of the wing tip device toe, stalling the device or reducing its incidence.

Preferably, the axis of rotation of the wing tip device is so positioned that the angle between the axis and the plane with which the wing is generally aligned is less than 30 degrees. More preferably, the angle between the axis of rotation of the wing tip device and the plane with which the wing is generally aligned is less than 10 degrees. Even more preferably, the axis of rotation of the wing tip device is so positioned that the axis and the plane with which the wing is generally aligned are substantially parallel.

The axis of rotation of the wing tip device is preferably positioned such that the wing tip device when in the second position generates less upward lift during flight of the aircraft than the wing tip device in the first position. Advantageously, the axis of rotation of the wing tip device is positioned such that the wing tip device in the second position has a lower mean incidence than the wing tip device in the first position.

The axis of rotation of the wing tip device may, for example, be so positioned that the angle between the axis and the vertical plane including the longitudinal axis of the aircraft is less than 45 degrees. The angle between the axis of rotation of the wing tip device and the vertical plane may be less than 30 degrees. The axis of rotation of the wing tip device may be generally aligned with the longitudinal axis of the aircraft. In an embodiment of the invention described below the axis of rotation of the wing tip device is so positioned that the angle between the axis and the vertical plane including the longitudinal axis of the aircraft is greater than 5 degrees. In that embodiment, the angle between the axis and the vertical plane is between 5 degrees and 30 degrees, so that the incidence of the wing tip device varies as it rotates about its axis.

In another embodiment of the invention also described below the axis of rotation of the wing tip device is so positioned that the axis of rotation of the device is generally transverse to the longitudinal axis of the aircraft when viewed from above. The axis of rotation of the wing tip device may be so positioned that the angle between the axis and the longitudinal axis when viewed from above is between 60 and 150 degrees, and more preferably between 90 and 130 degrees. (The angle in this case should be measured in a clockwise direction, when viewed from above, starting at the vertical plane so that, for example, a line extending between the centre of the aircraft to a point to the right of the nose might be at an angle of a few degrees over 0 degrees to the longitudinal axis when view from above, whereas a line extending from the centre of the aircraft to a point to the right of the tail might be at an angle of a few degrees below 180 degrees to the longitudinal axis.) The axis of rotation is preferably inclined at an angle when viewed from above so as to follow the general direction of the wing when viewed from above. The wing may for example be swept back. The axis of rotation of the wing tip device may be so positioned that it lies between the leading and trailing edges of the wing. Insofar as this aspect of the invention is concerned, and where the wing includes one or more spars, the axis of rotation of the device may be generally aligned with the length of a spar.

It will be understood that the longitudinal axis of the aircraft is generally an axis that lies along the plane of symmetry of the aircraft. For example, the longitudinal axis may be the longitudinal axis of the fuselage of the aircraft. The longitudinal axis of the aircraft insofar as this invention is concerned may, where the wing includes one or more ribs, be taken to be the axis along which a rib of the wing of the aircraft lies or, alternatively, be taken to be the direction of flight of the aircraft when cruising.

Advantageously, the wing tip device is mounted about a hinge joint for rotational movement. A hinge joint is particularly suitable in this application, as it is able both to provide the means for rotating the wing tip device and to withstand significant loads during use.

The shape of the wing tip device may be arranged to be changeable during use. The wing tip device may for example have a shape that can be changed in order to alter the incidence of the wing tip device and/or the upward lift generated by the wing or the wing tip device. The shape of a portion of the wing may also be arranged to be locally changeable during use in order to assist the reduction of the bending moment on the wing during high-load conditions. In the case where a portion of the wing has a changeable shape, it will be understood that the shape will be changeable to an extent over and above the change in shape of a conventionally designed wing owing to the movement resulting from the wing's natural flexibility and resiliency. The wing and/or the wing tip device itself may comprise a series of joints to enable the wing and/or wing tip device to change shape.

The axis of rotation of the wing tip device may be fixed relative to the wing. The axis of rotation of the wing tip device may alternatively be moveable relative to the wing. The movement of the wing tip device may for example be a combination of rotational movement and translational movement. For example, the wing tip device may be rotatable about an axis that is itself movable for example by translational movement. The movement of the wing tip device could for example be similar to the way in which flaps and slats conventionally move.

Above, it is stated that the shape of the wing and/or the wing tip device may be changeable. The wing and or wing tip device may for that purpose include, in the region of the wing tip device, a portion that is flexible, preferably significantly more flexible than other portions of the wing. Substantially the entire wing tip device may be so flexible. The flexible portion is preferably in the form of an elastically deformable portion. Preferably, at least a portion of the wing and/or the wing tip device is elastically deformable such that at least a part of the wing tip device is able to flex about the elastically deformable portion, thereby allowing the wing tip device to be movable between the first position and the second position.

The wing tip device may be controlled by active means. This allows the pilot, or a control system, a high degree of control over the deployment of the wing tip device. An actuator may be provided for causing movement of the wing tip device between the first position and the second position. Advantageously the actuator is a linear actuator. For example, the actuator may act in a direction aligned with the plane in which the wing generally lies and transverse to the longitudinal axis of the aircraft. The linear actuator may act in a direction that is generally transverse to the axis of rotation of the wing tip device. In the case where a linear actuator is provided, the axis of rotation of the wing tip device may be generally aligned with the longitudinal axis of the aircraft. The actuator may be a rotary actuator. For example, the actuator may act to cause rotational movement about an axis substantially parallel to the axis of rotation of the wing tip device.

The aircraft may include a load sensing device. The load sensing device may be arranged to sense a load on the wing. The aircraft may include a control system. The control system may be arranged such that in use the control system receives signals from a load sensing device. The control system may be arranged such that in use the control system sends signals to an actuator to move the wing tip device preferably in dependence on signals received from a load sensing device arranged to sense a load on the wing. The control system may be part of a system that controls other parts of the aircraft. The control system may for example be in the form of the aircraft flight control system. Alternatively, the control system may be a separate system designed for performing the function required by this aspect of the invention.

The aircraft may include a plurality of wings, each wing having a wing tip device in accordance with the present invention. In such a case, it is preferred that each wing tip device be independently movable (so that the movement of one wing tip device does not necessarily result in, or necessarily require, a corresponding movement of another wing tip device).

The wing tip device may be controlled by passive means. The aircraft may be so arranged that movement of the wing tip device between the first and second positions is able to be caused during flight of the aircraft as a result of the interaction between the wing tip device and the air moving past the wing tip device. The wing tip device may be moveable between the first position and the second position without the need of an actuator. In such a case, the wing tip device is advantageously arranged so that the wing tip device is caused to move (which may consist of it changing its shape with a portion of the device not changing its positions) so as to reduce the bending moment on the wing as the upward lift on the device increases. The wing tip device and wing may, for example, be so arranged and configured that as the lift on the wing tip device increases, the lift causes the wing tip device to rotate about its axis to move to a position at which the wing tip device reduces the upward lift on the wing. For example, the wing tip device and its axis of rotation may be so positioned that the centre of lift on the wing tip device is offset relative to the axis of rotation. Preferably, the wing tip device is so arranged that it is caused to move so as to reduce the bending moment on the wing as the lift on the device increases above a threshold load, there being substantially no movement caused below the threshold. The threshold load is greater than zero and advantageously is of the same order of magnitude as the lift that would be sustained during high-load conditions.

In an embodiment of the invention described in further detail below, the movement of the device is controlled by a dedicated spring-damper system, wherein the spring and damper system is so arranged as to set a bending moment threshold, whereby the wing tip device is caused to move from the first position to the second position only when the bending moment threshold is exceeded. Advantageously, the spring controls the bending moment threshold and the damper is provided so as to reduce the effects of divergent behaviour or flutter. Thus, there may be provided a resilient means, such as for example a spring, which affects the movement and behaviour of the wing tip device during use. There may be provided a damping means, such as for example a damper, which affects the movement and behaviour of the wing tip device during use.

In a situation when the load on the wing is on the boundary of a high-loading case, it may be undesirable for the wing tip device to move between the first and second positions. Such movement might for example result in undesirable oscillations of the wing tip device. There may be provided a damper, for example a unidirectional damper that reduces the possibility of such oscillations. A unidirectional damper may be employed to provide substantially no resistance to the movement of the wing tip device from the first position towards the second position, but to provide resistance to the movement of the wing tip device to the first position.

The wing tip device may be so shaped and arranged that during flight conditions it is able to move to a position in which it extends from the wing in a direction at greater than 30 degrees to the normal of the plane with which the wing is generally aligned. The wing tip device may be so arranged that during normal operation during flight of the aircraft the wing tip device is always in a position in which it extends from the wing in a direction at greater than 30 degrees to the normal. The wing tip device may be so arranged that during flight of the aircraft the wing tip device in its first position extends from the wing in a direction at about 45 degrees to the normal. The wing tip device may be so shaped and arranged that during flight conditions it is able to move to positions in which it extends from the wing in a direction at any of a multiplicity of angles in the range of 30 to 80 degrees to the normal of the plane with which the wing is generally aligned. Insofar as this feature of the invention is concerned the normal of said plane will, when the aircraft is positioned on the ground, generally be aligned with the vertical.

According to another aspect of the present invention there is also provided an aircraft comprising a wing, the wing comprising a root, a tip, and a wing tip device mounted in the region of the tip, wherein the wing tip device is rotatably moveable between a first position and a second position, and the wing tip device is so arranged that, during flight of the aircraft, the bending moment at the root changes in dependence on the position of the wing tip device. Features described herein relating to other aspects of the invention may of course be incorporated into this aspect of the invention. For example, the axis of rotation of the wing tip device may be so positioned that the angle between the axis and the plane with which the wing is generally aligned is less than 45 degrees.

The present invention also provides a wing including a wing tip device, the wing and wing tip device being arranged in accordance with the wing of the aircraft according to any aspect of the present invention as described herein. The present invention also provides a wing tip device arranged in accordance with the wing tip device of the wing of the aircraft according to any aspect of the present invention as described herein. There may for example be provided a wing tip device suitable for use in an aircraft according to any aspect of the present invention as described herein. The wing tip device may for example include a flexible portion that enables passive movement of the device in use.

There is also provided a kit of parts including a wing tip device, the parts being suitable for converting an aircraft into an aircraft according to any aspect of the present invention as described herein. The kit of parts may be used to retro-fit a wing tip device according to the present invention to a conventional aircraft. The kit of parts may include an actuator as described herein. The kit of parts may include a hinge as described herein. The kit of parts may include means for converting the existing control systems of the aircraft into a control system as described herein.

The present invention yet further provides a method of altering the bending moment in a wing of an aircraft, the method including the steps of rotatably moving a wing tip device from a first position to a second position, the axis of rotation of the wing tip device being so positioned that the angle between the axis and the plane with which the wing is generally aligned is less than 45 degrees, so as to cause the bending moment at the root of the wing to change. The maximum bending moment at the root of the wing sustained during high-load flight conditions may thereby be reduced. Preferably, the method includes a step of measuring a load on the wing and preferably a further step of moving the wing tip device in dependence on the result of the load measurement. The method may for example include a step of actuating the wing tip device in dependence on the magnitude and nature of detected loading on the wing.

There is also provided a method of flying an aircraft, wherein the bending moment in the wing sustained during high-load flight conditions is reduced by means of use of a wing tip device according to the present invention or by means of performing a method of altering the bending moment according to the present invention.

Various embodiments of the invention will now be described, by way of example only, with reference to the accompanying schematic drawings of which.

DESCRIPTION OF THE DRAWINGS

DETAILED DESCRIPTION OF THE PREFERRED EMBODIMENTS

Figure 1A:
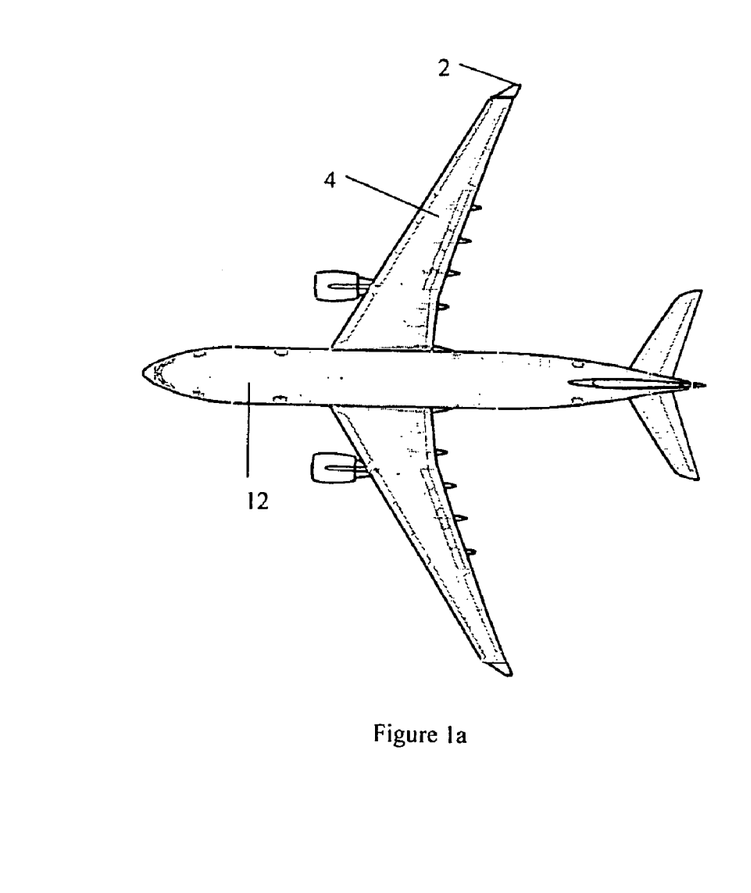
FIGS. 1*a–c* are illustrations of a commercial aircraft with wing tip devices according to a first embodiment of the invention.
Figure 1B:
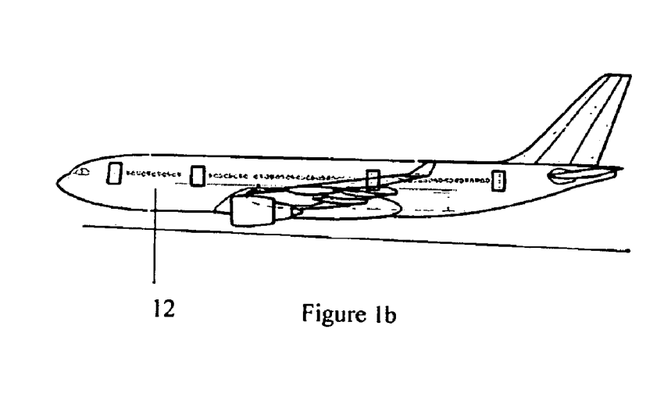
Figure 1C:
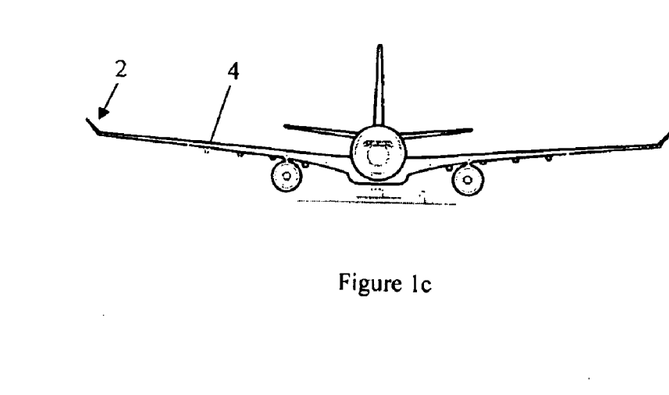
Figure 2:
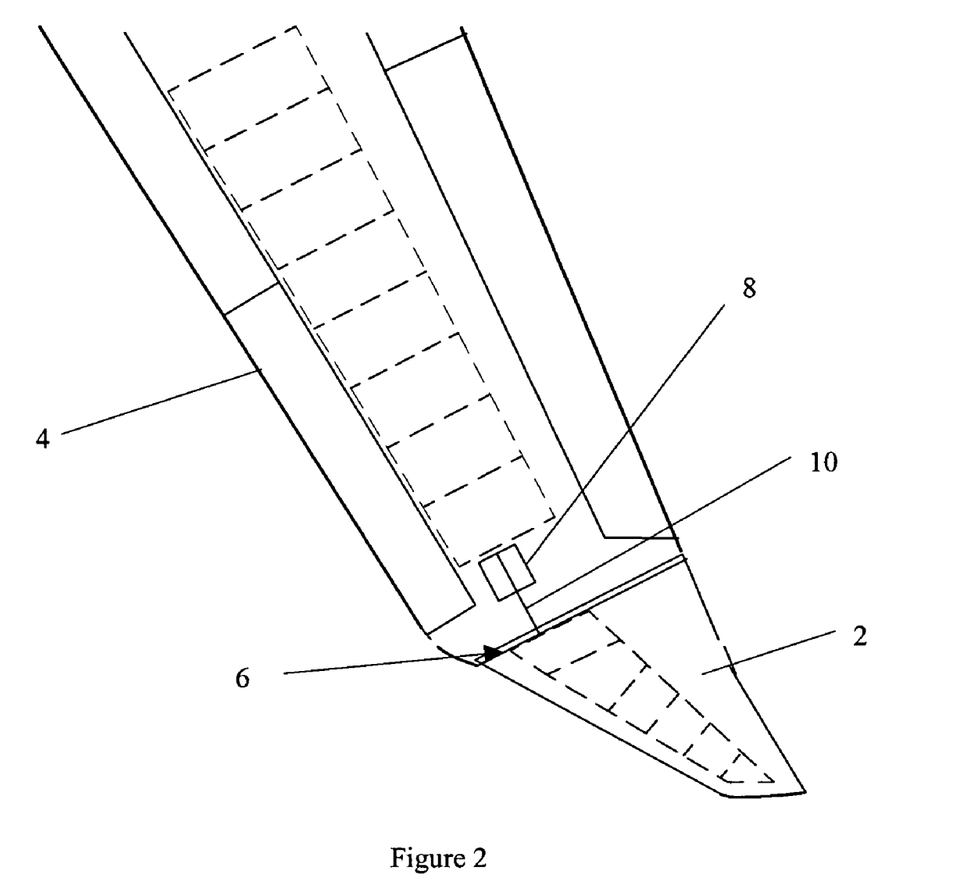
FIG. 2 shows a plan view of the wing tip device in the first embodiment of the invention, the actuation system being shown in a cut-away view.
Figure 3:
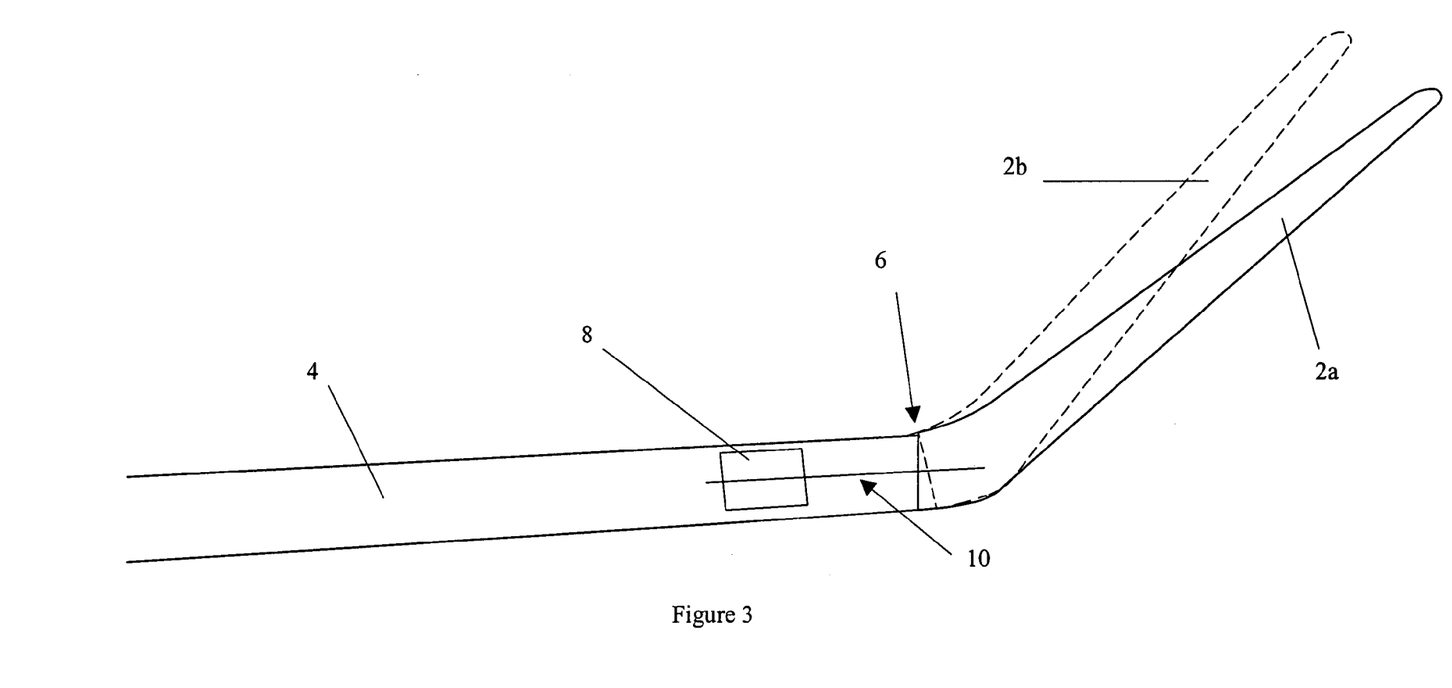
FIG. 3 shows a cross-sectional view of the wing tip device illustrated in FIG. 2.

FIGS. 1*a–c* show a wing tip device 2 mounted at the tip of an aircraft wing 4 of an aircraft in accordance with a first invention, that is illustrated in more detail in FIGS. 2 and 3. The wing tip device illustrated is in the form of a winglet. Referring to FIGS. 2 and 3, the wing tip device 2 is mounted on a hinge 6 on the upper surface of the main wing 4. The wing tip device 2 is able to pivot from a first position 2*a* to a second position 2*b* (shown in broken outline in FIG. 3). The first position is the position held by the wing tip device during standard flight conditions, such as take-off, climb and cruise. In the first position, the wing tip device acts in flight to improve the aerodynamics of the wing and the upward lift produced by the wing including the wing tip device. The wing tip device 2 in its first position 2*a* extends from the wing 4 in a direction at about 45 degrees to the plane of the wing. In the second position 2*b* the aerodynamics of the wing are disrupted and the upward lift produced by the wing thereby reduced. The wing tip device 2 in its second position 2*b* extends from the wing 4 in a direction at about 55 degrees to the plane of the wing. The wing tip device 2 is able to be moved to a position (not shown) at which it extends from the wing 4 in a direction at about 65 degrees to the plane of the wing.

The axis of rotation of the hinge 6 is generally horizontal and aligned with the plane of the wing and is generally aligned with the direction of flight, being at an angle of about 10 degrees to the vertical plane that includes the longitudinal axis of the fuselage. The axis of rotation of the hinge 6 is aligned so that the mean incidence of the wing tip device 2 decreases when the wing tip device is rotated from the first position 2*a* to the second position 2*b* (i.e. rotated about the hinge 6 in an anticlockwise direction when viewed from ahead). The wing tip device 2 may be rotated about the hinge 6 to a lesser or greater extent than that shown in FIG. 3, depending on the high-load conditions encountered.

A linear actuator 8 is mounted within the structure of the aircraft main wing 4. A rod 10 is mounted for linear movement in a direction perpendicular to the axis hinge 6 and substantially in the plane of the wing 4. One end of the rod 10 is connected to a mechanism (not shown) on the wing tip device 2, the mechanism allowing rotation of the wing tip device about the hinge 6, without placing the rod 10 under excessive stresses due to forces out of the plane of the wing.

As previously described, during standard flight conditions the wing tip device 2 is held in its first position 2*a*. In high-load conditions, such as turbulence or during a sharp turn, the wing tip device is rotated from the first position 2*a* towards the second position 2*b*. High-load conditions can be detected or predicted using systems already in place on most commercial aircraft such as accelerometers, pilot controls and other sensory equipment.

In this first embodiment of the invention, the position of the wing tip device 2 is actively controlled. When a high-load condition is detected or predicted, part of the flight controls computer sends signals that cause the rod 10 to move along the length of the wing 4 and away from the fuselage 12. The wing tip device 2 is constrained to pivot about the hinge 6 on the upper surface of the main wing 4. The action of the rod 10 therefore causes upward rotation of the wing tip device away from its first position 2*a*.

The airflow over the tip region of the wing 4 is disturbed, resulting in a loss of upward lift, a reduction in effective span and hence a reduction in bending moment at the root of the wing 4. Furthermore, the alignment of the hinge 6 is such that the mean incidence of the wing tip device 2 is reduced, decreasing the upward lift generated by the device and therefore further decreasing the bending moment at the root of the wing 4.

When the high-load condition is passed, the rod 10 is retracted, returning the wing tip device 2 to its first position 2a. Thus, the first embodiment provides a means of reducing the maximum bending moment that an aircraft wing is likely to have to sustain during the aircraft's working life (i.e. including high-load conditions). In turn, this allows the structural load bearing capacity of the wing to be reduced, which in turn can yield important savings in the structural mass of the aircraft and provide the many advantages that a reduction in mass of the aircraft that follow.

Figure 4:
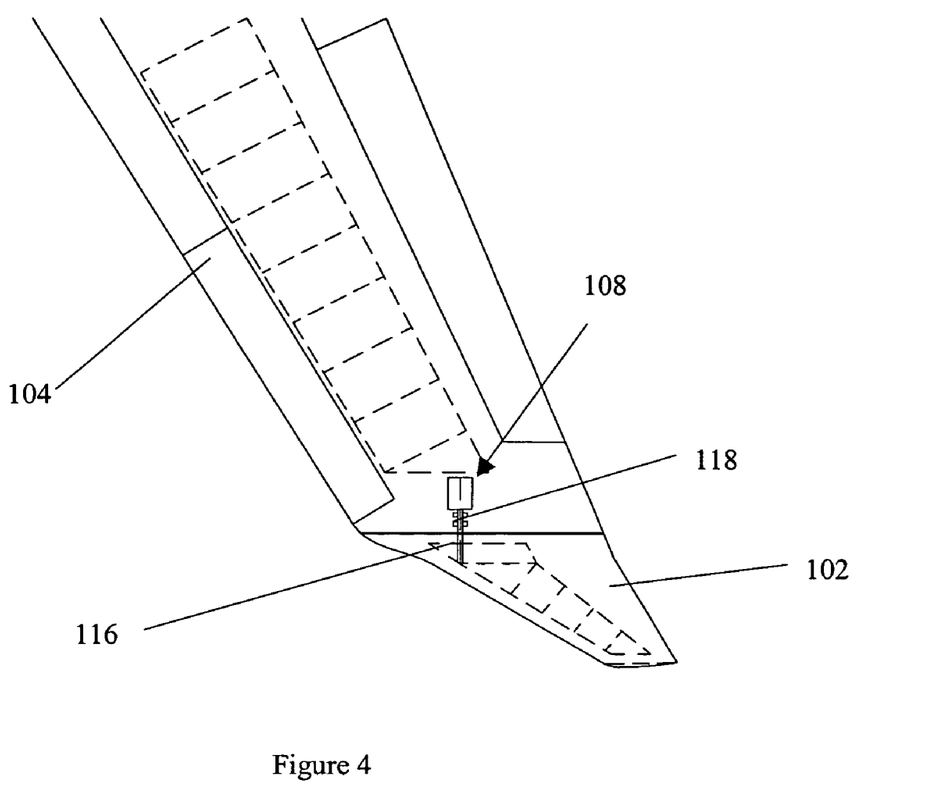
FIG. 4 shows a plan view of the wing tip device in a second embodiment of the invention, the actuation system being shown in a cut-away view.

FIG. 4 shows a second embodiment of the invention, similar to the first embodiment, in which the wing of an aircraft includes a wing tip device 102 arranged to move between a first position in which the wing tip device 102 functions to improve the aerodynamic efficiency of the wing and a second position in which the device 102 reduces the upward lift provided by the wing and therefore reduces the bending moment in the wing. In this second embodiment however the wing tip device is arranged to rotate about an axis that, whilst still generally horizontal and aligned with the plane of the wing, is transverse to the length of the fuselage. The wing tip device 102 is position such that it is closer to the fuselage 12 at the leading edge than at the trailing edge.

A rotary actuator 108 is mounted within the structure of the aircraft main wing 104. The wing tip device 102 is connected to the main wing 104 by a drive shaft 116 that is both generally aligned with the plane of the main wing and substantially in line with the leading and trailing edges of the wing (at an angle of about 120 degrees to the longitudinal axis of the fuselage of the aircraft). The drive shaft 116 is supported on bearings 118 within the actuator 108. The bearings 118 ensure that there is substantially zero translational movement of the shaft 116 along the length of the wing 104. The rotary actuator 108 and drive shaft 116 therefore fulfil the functions of both support and control.

In this second embodiment, the wing tip device 102 is held in the first position during standard flight conditions and the wing tip device is controlled through active means. In the first position, the external surfaces of the wing tip device are flush with the adjacent external surfaces of the wing. When a high-load condition is detected or predicted, the actuator rotates the drive shaft 116 anticlockwise when viewed from the wing tip, rotating the wing tip device 102 leading edge down, to the second position. In the second position the edges of the wing tip device and wing that were parallel in the first position become non-parallel and the surfaces of the wing tip device and the wing are positioned so that they are no longer flush. The airflow over the tip region of the wing 104 is disturbed, resulting in a loss of upward lift, a reduction in effective span and hence a reduction in bending moment at the root of the wing 104. Furthermore, the mean incidence of the wing tip device 102 is reduced, decreasing the upward lift generated by the device and therefore decreasing the bending moment at the root of the wing 104.

When the high-load condition is passed, the actuator rotates drive shaft 116 clockwise when viewed from the wing tip, returning the wing tip device 102 to the first position.

In variations (not shown) of the above-described preferred embodiment of the invention the wing tip device is controlled through passive means, such that when the lift on the wing tip device is sufficiently large, it is caused to move towards the second position by means of the loads on the wing tip device resulting from the lift.

According to a third embodiment (not shown), relating to a wing tip device very similar to the wing tip device of the first embodiment, the passive control is a spring-damper system comprising a spring and a unidirectional damper. The unidirectional damper is employed to provide resistance to the return of the wing tip device to the first position, but to provide no resistance to the rotation of the wing tip device when the bending moment threshold is first exceeded. Thus, the spring controls the bending moment threshold and the damper prevents divergent behaviour or flutter.

In a fourth embodiment (not shown) a section of flexible elastic material, comprising rubber material, is located between the wing tip device and the main wing. The flexible section effectively allows movement of the wing device in a manner similar to that provided by the hinge of the first embodiment. As the lift on the wing tip device increases, the section of material is sufficiently flexible that the load resulting from the lift on the wing tip device moves the wing tip device from the first position to the second position at which the overall upward lift on the wing is reduced. The wing tip device therefore reaches an equilibrium position for any high-load condition.

According to a fifth embodiment (not shown), relating to a wing tip device very similar to the wing tip device of the second embodiment, a freely rotating bearing is located approximately where the drive shaft is shown in FIG. 4 and supports a shaft protruding from the wing tip device. Rotation of the tip device is controlled through an independent linkage mechanism aft of the main rotary joint activated by a linear actuator. In a sixth embodiment, (a variation, not shown, of the fifth embodiment) the wing tip device is supported on a freely rotating bearing (as above) and the drive shaft of a rotary actuator passes down the centre of the support bearing. Both these variations allow the functions of support and actuation to be separated.

In a seventh embodiment (not shown) relating to a wing tip device very similar to the wing tip device of the second embodiment of the invention, the wing tip device is controlled through passive means. The axis of rotation of the wing tip device is located to one side of the centre of lift of the wing tip device. As the lift on the wing tip device increases, the moment generated about the axis of rotation causes the wing tip device to rotate to a position in which it generates less upward lift. In this embodiment, the system incorporates a spring that sets the threshold at which the device will rotate. This serves to reduce small scale movement of the wing about the first position and helps to reduce flutter.

It will be appreciated that various modifications may be made to the above-described embodiments of the invention. In each embodiment the wing tip device is in the form of a winglet, but the device could of course be in the form of any wing tip device that is able to improve aerodynamic efficiency when in the first position, but might cause high bending moments on the wing of the aircraft during high-load conditions. In such a modified embodiment, the device would be moveable to a second position in which the device reduces the bending moments in the main wing, for example in high-load conditions. The function of the flexible joint of the fourth embodiment may be provided by means of the wing, a portion thereof, the wing tip device, or a portion thereof, being made from an elastomeric material or a composite material having suitable resilient (springy) properties.

The invention claimed is:

1. An aircraft comprising a wing, the wing comprising a root, a tip, and a wingtip device mounted in the region of the tip, there being a first plane with which the wing is generally aligned, and a second plane which is vertical and includes the longitudinal axis of the aircraft, the wingtip device being rotatably moveable between a first position and a second position, and being so arranged that, during flight of the aircraft, the bending moment at the root changes in dependence on the position of the wingtip device so that the maximum bending moment at the root of the wing sustained during high-load flight conditions may be reduced, wherein the axis of rotation of the wingtip device is so positioned that:

(a) the acute angle between the axis of rotation and the first plane is less than 45 degrees, and (b) the acute angle between the axis of rotation and the second plane is between 5 and 30 degrees, and wherein the axis of rotation of the wingtip device is so positioned and the wing and wingtip device are so arranged that:

(c) the mean incidence of the wingtip device, when the wingtip device is in the second position, is less than the mean incidence of the wingtip device were the wingtip device in the first position.

2. An aircraft according to claim 1, wherein the axis of rotation of the wingtip device is substantially parallel to the first plane.

3. An aircraft according to claim 1, wherein the wingtip device is mounted about a hinge joint for rotational movement.

4. An aircraft according to claim 1, wherein the shape of the wingtip device is arranged to be changeable during use.

5. An aircraft according to claim 1, wherein the wingtip device is mounted about an elastically deformable portion for rotational movement of the wingtip device between the first position and the second position.

6. An aircraft according to claim 1, wherein the aircraft includes a load sensing device arranged to sense a load on the wing and a control system arranged such that in use the control system receives signals from the load sensing device and sends signals to an actuator to move the wingtip device in dependence on the signals received from the load sensing device.

7. An aircraft according to claim 1, wherein the wing includes a linear actuator for causing movement of the wingtip device between the first position and the second position.

8. An aircraft according to claim 3, wherein the hinge joint is so arranged that movement of the wingtip device between the first and second positions is able to be caused during flight of the aircraft as a result of the interaction between the wingtip device and the air moving past the wingtip device.

9. A wing for an aircraft, the wing including a root, a tip, and a wingtip device mounted in the region of the tip, there being a first plane with which the wing is generally aligned, and a second plane which is vertical and includes the longitudinal axis of the aircraft, the wingtip device being rotatably moveable between a first position and a second position, and being so arranged that, during flight of an aircraft to which the wing is attached, the bending moment at the root changes in dependence on the position of the wingtip device so that the maximum bending moment at the root of the wing sustained during high-load flight conditions may be reduced, wherein (a) the axis of rotation of the wingtip device is so positioned that the acute angle between the axis of rotation and the first plane is less than 45 degrees, (b) the axis of rotation of the wingtip device is so positioned that, when the wing is attached to an aircraft, the acute angle between the axis of rotation and the second plane is between 5 and 30 degrees, and (c) the axis of rotation of the wingtip device is so positioned and the wing and wingtip device are so arranged that the mean incidence of the wingtip device, when the wingtip device is in the second position, is less than the mean incidence of the wingtip device were the wingtip device in the first position.

10. A wingtip device for a wing on an aircraft, there being a first plane with which the wins is generally aligned, and a second plane which is vertical and includes the longitudinal axis of the aircraft, the wingtip device including a mounting portion for facilitating attachment of the wingtip device to the wing in the region of the wingtip, the wingtip device being rotatably moveable relative to the mounting portion between a first position and a second position, and being so arranged that, during flight of an aircraft to which the wingtip device is attached, the bending moment at the root changes in dependence on the position of the wingtip device so that the maximum bending moment sustained during high-load flight conditions at the root of the wing, to which the wingtip device is attached, may be reduced, wherein (a) the axis of rotation of the wingtip device is so positioned that, when the wingtip is attached to an aircraft wing, the acute angle between the axis of rotation and the first plane is less than 45 degrees, (b) the axis of rotation of the wingtip device is so positioned that, when the wingtip is attached to an aircraft, the acute angle between the axis of rotation and the second plane is between 5 and 30 degrees, and (c) the wingtip device is so arranged and configured that, when attached to a wing by means of the mounting portion, the mean incidence of the wingtip device, when the wingtip device is in the second position, is less than the mean incidence of the wingtip device were the wingtip device in the first position.

* * * * *